United States Patent [19]

Tanami et al.

[11] Patent Number: 4,821,017
[45] Date of Patent: Apr. 11, 1989

[54] PROTECTIVE SYSTEM FOR PROTECTING AGAINST ASSAULTS AND/OR INTRUSIONS

[76] Inventors: Yair Tanami, Ben Geven St. 6; Yoav Madar, Shapira St. 54/19, both of Gedera, Israel

[21] Appl. No.: 3,038

[22] Filed: Jan. 13, 1987

[30] Foreign Application Priority Data

Jan. 22, 1986 [IL] Israel ............................................ 77679
Dec. 22, 1986 [IL] Israel ............................................ 81062

[51] Int. Cl.⁴ ........................ B60R 25/00; G08B 15/00
[52] U.S. Cl. ...................................... 340/430; 340/68; 307/10 AT
[58] Field of Search ............... 128/376, 377, 378; 340/63, 68, 407; 307/10 AT; 256/10

[56] References Cited

U.S. PATENT DOCUMENTS

| | | | |
|---|---|---|---|
| 1,164,205 | 12/1915 | Odenwald | 128/377 |
| 1,550,497 | 8/1925 | Bray et al. | 128/377 X |
| 1,602,103 | 10/1926 | DeMoulin | 128/377 X |
| 2,057,138 | 10/1936 | Dowell | 340/63 |
| 2,186,597 | 1/1940 | Westbrooke | 340/63 |
| 4,123,745 | 10/1978 | Gurgone | 340/63 |

Primary Examiner—Joseph A. Orsino
Assistant Examiner—Brian R. Tumm

[57] ABSTRACT

A protective system for protecting a motor vehicle driver against an assault or threat of violence by a passenger, comprises: a discharge electrode disposed on the vehicle seat to be occupied by such passenger, and exposed for contact by the passenger when sitting on the seat; a high voltage generator connected to the discharge electrode; and an electrical switch actuated by the driver for energizing the electrode. The protective system further includes an arrangement for protecting also against intrusion of the vehicle, and a mode selector switch effective to select either an assault-protection mode or an intrusion-detection mode.

15 Claims, 2 Drawing Sheets

PROTECTIVE SYSTEM FOR PROTECTING AGAINST ASSAULTS AND/OR INTRUSIONS

BACKGROUND OF THE INVENTION

The present invention relates to a protective system for protecting a motor vehicle driver, particularly a taxi driver, against an assault or threat of violence by a passenger in the vehicle.

In recent years, there have been many instances where motor vehicle drivers, particularly taxi drivers, have been threatened with violence by a passenger of the vehicle. Up to the present time, there has been no satisfactory answer to such a threat of violence.

SUMMARY OF THE INVENTION

An object of the present invention is to provide a protective system for protecting a motor vehicle driver against such threats. Another object of the invention is to provide a protective system also for protecting the motor vehicle against intrusions, e.g., against breaking-in or theft.

According to the present invention, there is provided a protective system for protecting a motor vehicle driver against an assault or threat of violence by a passenger, comprising: a discharge electrode disposed on the vehicle seat to be occupied by such passenger, and exposed for contact by the passenger when sitting on the seat; a high voltage generator connected to the electrode; and electrical switch means actuatable by the driver for energizing the electrode. The voltage shock received by the passenger threatening the violence is sufficient to immobilize him and to cause him to drop his weapon if he is using one.

According to a preferred feature, the discharge electrode includes one or more metal electrode elements covered by an insulating layer to provide a capacitive discharge upon energization of the discharge electrode while in contact with the passenger occupying a seat equipped with the discharge electrode.

According to yet another preferred feature, the system further includes a mode selector switch effective to select either an assault-protection mode wherein one of the metal electrode elements is connected to the high voltage generator and another is connected to ground, or an intrusion-detection mode wherein both of the metal electrode elements are connected to the high voltage generator.

According to yet another preferred feature, the system further includes one or more sensor switches which are actuated by an intruder; an alarm device; and a control circuit including means effective, when the mode-selector switch is in the intrusion-detection mode, to actuate the alarm device upon the actuation of one of the sensor switches by an intruder. In the described embodiment, the control circuit also actuates the high voltage generator upon the actuation of one of the sensor switches by an intruder.

It will thus be seen that the protective system of the present application is capable of performing the dual function of protecting the driver against an assault by another passenger, and also protecting the vehicle from an intrusion when the vehicle is unattended.

Further features and advantages of the invention of the present application will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
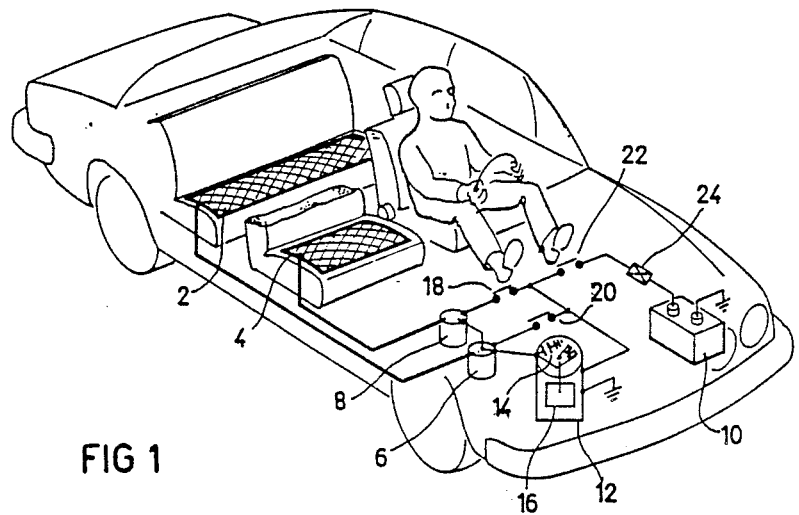
FIG. 1 pictorially illustrates a protective system constructed in accordance with the present invention.

The protective system pictorially illustrated in FIG. 1 comprises a pair of discharge electrodes 2, 4, each adapted to be energized with a high voltage under the control of the vehicle driver. Thus, discharge electrode 2 is placed on the complete rear vehicle seat so as to be exposed for contact by any passenger occupying that seat; and discharge electrode 4 is placed over the part of the front vehicle seat next to the driver so as to be exposed for contact by any passenger occupying that seat.

The two discharge electrodes 2, 4, are both connected to a high voltage generator including a separate ignition coil 6, 8, for each discharge electrode. The two ignition coils 6, 8, may be of the type provided in an automobile ignition system for supplying the spark plugs. Thus, each ignition coil 6, 8 includes a primary low-voltage circuit connected to a battery 10, e.g., the vehicle battery, and a high voltage generator unit 12. Unit 12 includes a set of breaker points 14 driven by a motor 16 energized by battery 10. The breaker points 14 are selectively connected to the primary low-voltage circuit of either of the two ignition coils 6, 8 by a switch selector 18, 20, enabling the driver to preselect the discharge electrode 2, 4 to be energized with the high voltage. The actual energization of the selected discharge electrode is effected by a switch 22, which is preferably a foot-operated switch enabling the driver to energize the selected discharge electrode without alerting the threatening passenger.

The high-voltage secondary circuit of each ignition coil 6, 8, is connected to the respective discharge electrode 2, 4, to receive the high voltage generated in its respective ignition coil. The illustrated system further includes a protective fuse 24.

The manner of using the system illustrated in FIG. 1 will be apparent from the above description. Thus, if a suspiciously looking passenger enters the vehicle and occupies the rear seat, the driver may depress switch 20 so as to select discharge electrode 2 over the rear seat for receiving the high voltage. The selected discharge electrode, however, is not energized with the high voltage unless and until the driver operates foot-operated switch 22. When the operator does operate switch 22, the high voltage generator unit 12 and the respective ignition coil 6, generate a high voltage which is applied to the preselected discharge electrode 2, such as to subject the threatening passenger to a very severe shock, sufficient to immobilize him and to cause him to drop his weapon if holding one.

FIGS. 2-5 illustrate modifications to the system of FIG. 1.

One important improvement is in the construction of the discharge electrodes 2, 4 of FIG. 1. Whereas in FIG. 1 each is in the form of a metal screen, in FIGS. 4 and 5 each discharge electrode, therein generally designated 100, includes two metal electrode elements 102, 104, each covered on its opposite sides by thin insulating layers 106, 108. Such a discharge electrode produces a capacitive discharge to the passenger directly contacting the discharge electrode when energized by the high voltage generator. Preferably, the outer insulating layer 106 is of a thin fabric, porous plastic, or the like, whereas the inner insulating layer 108 is of plastic.

Figure 4:
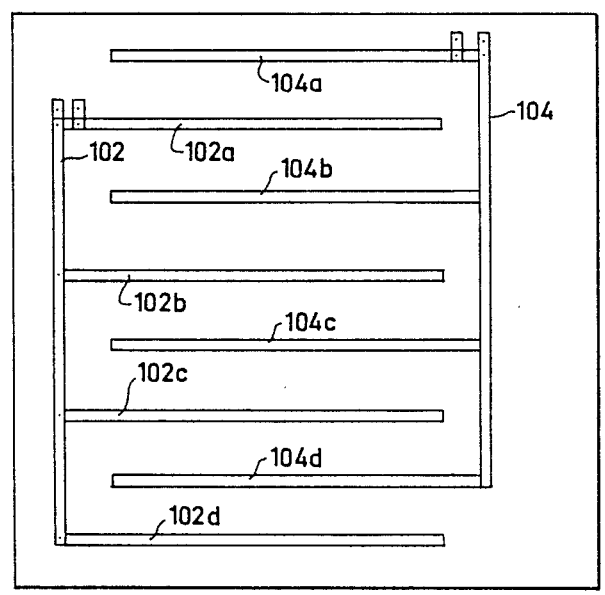
FIG. 4 is a front view illustrating a discharge electrode that may be used in the system of FIGS. 1–3.
Figure 5:
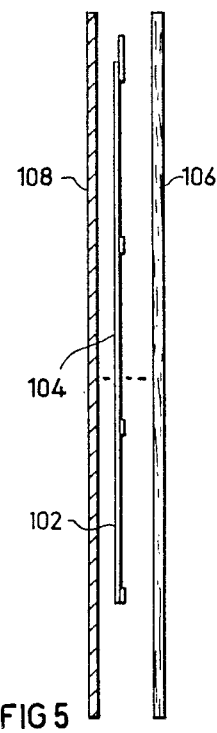
FIG. 5 is an exploded side view more particularly illustrating the construction of the discharge electrode of FIG. 4.

As shown in FIG. 4, each of the two metal electrode elements 102, 104 has a plurality of fingers 102a-102d and 104a-104d respectively. Fingers 102a-102d of metal electrode element 102 are interleaved between and spaced from fingers 104a-104d of metal electrode element 104. As will be described more particularly below, the system can be operated either according to an assault protection mode, wherein one of the metal electrode elements (e.g., 102) is connected to the high voltage generator, and the other metal electrode element (e.g., 104) is connected to ground; or according to an intrusion-protection mode, wherein both of the metal electrode elements are connected to the high voltage generator.

Figure 2:
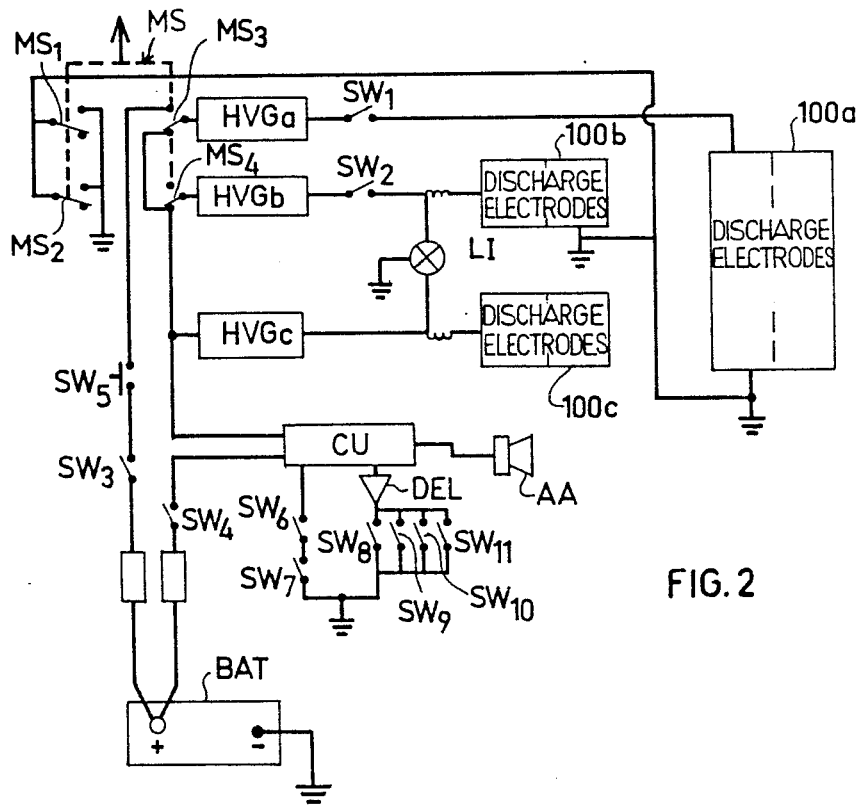
FIG. 2 is a block diagram illustrating another form of electrical system that may be used in the protective system of FIG. 1.

In the system illustrated in FIG. 2, a discharge electrode 100c is provided over the driver's seat, in addition to the two discharge electrodes 100a, 100b applied over the rear passenger seat and front passenger seat, respectively. The discharge electrode for the driver's seat is operative only during the intrusion-detection mode, as will be described more particularly below.

A separate high voltage generator HVGa-HVGc is provided for each of the three discharge electrodes 100a-100c. High voltage generator HUGa is connected to the rear-seat discharge electrode 100a via switch SW$_1$, which corresponds to switch 20 in FIG. 1; and high voltage generator HVGb is connected to the front-passenger seat 100b via switch SW$_2$ corresponding switch 18 in FIG. 1. No switch is provided between high voltage generator HVGc and the driver-seat discharge electrode 100c, since the latter electrode is not selectively controlled by such a switch, but rather by a control unit CU, to make it operative only during the intrusion-protection mode (i.e., it is not operative during the assault-protection mode).

The system is supplied from the vehicle battery BAT, or a separate battery provided for this purpose. The system includes a main switch SW$_3$ for powering the system, another switch SW$_4$ which is closed by the driver when the system is in the intrusion-detection mode, and a further switch SW$_5$, corresponding to switch 22 in FIG. 1, which is closed by the driver, in case of an assault or other threat of violence, when the system is in the assault-protection mode.

The system further includes a number of sensor switches SW$_6$-SW$_{11}$ which are operative in the intrusion-detection mode. Sensor switches SW$_6$ and SW$_7$ are located to be actuated when an attempt is made to lift the engine hood or vehicle trunk; the actuation of either switch immediately actuates an audible alarm device AA via the control unit CU. Sensor switches SW$_9$-SW$_{11}$ are located to be actuated when an attempt is made to open any of the vehicle doors, but in these cases a delay (e.g., about 45 seconds) is interposed, by a delay circuit schematically indicated at DEL, before the control unit CU actuates the audible alarm device AA; this is to enable the driver to disable the intrusion detection system and the alarm device by opening switch SW$_4$.

The system illustrated in FIG. 2 further includes a light indicator LI which is energized whenever the system is in the assault-protection mode, to indicate this fact to the driver.

A mode selector switch MS is provided to permit the driver to select either the assault-protection mode or the intrusion-detection mode. Mode selector switch selector MS includes four movable contacts MS$_1$-MS$_4$ movable together from an upper position wherein the assault-protection mode is selected, or to a lower position wherein the intrusion-detection mode is selected. When the assualt-protection mode is selected, a connection is made from the high voltage generators HVGa and HVGb to their respective discharge electrodes 100a and 100b. Such a connection, made to the battery BAT, includes the main switch SW$_3$ which would normally be closed, and also switches SW$_1$ and SW$_2$ between the discharge electrodes 100a and 100b and their respective high voltage generators HVGa and HVGb. The latter switches select which one, or both, of the two discharge electrodes 100a, 100b will receive high voltages from their respective high voltage generators HVGa, HVGb.

The above selection is made beforehand by the driver; that is, if a suspicious person occupies the rear passenger seat the driver would close switch SW$_1$ to be ready to energize discharge electrode 100a; and if a suspicious person occupies the front passenger seat, the driver would close switch SW$_2$ to be ready to energize discharge electrode 100b. However, the actual energization of these discharge electrodes is not effected unless and until the driver closes switch SW$_2$, whereupon the selected discharge electrode 100a or 100b (or both) receive a high voltage from their respective high voltage generators HVGa, HVGb.

Mode selector switch MS, when set in the assault-protection mode by moving its contacts MS$_1$-MS$_4$ to the upper position, connects one of the metal electrode elements 104, including its fingers 104a-104d, to ground as seen in FIG. 2; the other metal electrode element 102, including its fingers 102a-102d, is connected to the respective high voltage generator HVGa, HVGb. However, when the mode selector switch MS is moved to its lower position, to select the intrusion-detection mode, both metal electrode elements 102, 104 of the two discharge electrodes 100a, 100b are connected to their respective high voltage generators HVGa, HVGb; in addition, in the intrusion-detection mode both of the metal electrode elements 102, 104 in the discharge electrode 100c over the driver's seat are connected to their respective high voltage generator HVGc.

Thus, when the discharge electrodes 100a, 100b are energized while the system is in the assault-protection mode, the passenger in contact with the respective discharge electrode will receive an immediate shock; but if either of these discharge electrodes, or the driver-seat electrode 100c, is energized while the system is in the intrusion-detection mode, the person (i.e., the intruder) in contact with the discharge electrode will receive an electrical shock only when that person touches ground.

Figure 3:
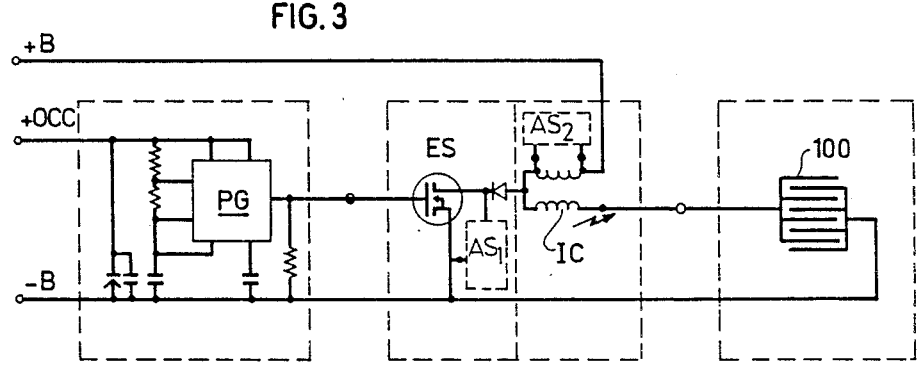
FIG. 3 is a block diagram illustrating one form of high voltage generator which may be used for each of the high voltage generators in the system of FIG. 2.

FIG. 3 illustrates one construction that may be used for each of the high voltage generators HVGa-HVGc.

Thus, each such high voltage generator includes a pulse generator PG which pulses an electronic switch ES to interrupt current to an induction coil IC which generates the high voltage to the respective discharge electrode 100a–100c. Pulse generator PG may be a commercially-available unit, such as Motorola MC1455, and may supply the pulses in bursts. Electronic switch ES is a power transistor. A first arc-supression circuit AS1 is applied across the transistor to supress arcs thereacross, and a second arc-supression circuit AS2 is applied across a tapped winding of the induction coil IC.

The system illustrated in FIGS. 2–5 operates as follows:

While the driver (e.g., a taxi driver) is operating the vehicle, he would normally select the assault-protection mode by moving mode selector switch MS to set its contacts $MS_1$–$MS_4$ to their upper positions. In addition, the driver would close the main switch $SW_3$.

If and when a suspicious person enters the vehicle and sits in the rear seat, the operator would actuate switch $SW_1$ so as to connect the rear-seat discharge electrode 100a to its high voltage generator HVGa; and if a suspicious person sat in the front seat next to the driver, the driver would close switch $SW_2$ so as to connect the front-seat discharge electrode 100b to its high voltage generator HVGb. Nothing happens, however, unless an assualt or other threat of violece is made on the driver, whereupon the driver needs only to depress switch, $SW_5$, preferably a foot-operated switch; this will immediately cause the high voltage generator to apply a high voltage to the respective discharge electrode, sufficient to immobolize the person making the assault or threatening the violence, and causing him to drop his weapon if he is holding one.

In the arrangement illustrated in FIGS. 2–5, bursts of high voltages of up to 60,000 volts peak have been produced which were found sufficient to temporarily immobilize the threatening person without permanently injuring him.

When the vehicle is not in use, the operator may preset the mode selector switch MS to the intrusion-detection mode by merely moving the switch contacts $MS_1$–$MS_4$ to their lower positions and also closing switch $SW_4$. In addition, the two electrode-selector switches $SW_1$ and $SW_2$ would also be closed.

Now, should an intruder attempt to open the engine hood or trunk lid, the respective sensor switch $SW_6$, $SW_7$4 will be actuated. This will immediately actuate the audible alarm device AA via the control unit CU.

Should a person attempt to open one of the doors, this will actuate one of the sensor switches $SW_8$–$SW_{11}$, but in this case the audio alarm AA is not immediately actuated; rather, delay circuit DEL interposes a delay, e.g., of 45 seconds, before actuating the audio alarm device AA to enable an authorized person to disable the circuit by opening the intrusion-protection switch $SW_4$, or the main switch $SW_3$.

Actuation of one of the sensor switches $SW_6$–$SW_{11}$ will also energize all three discharge electrodes 100a–100c from their respective high voltage generators HVGa–HVGc via the control unit CU. As noted above, when the system is in the intrusion detection mode, both of the metal electrode elements 102, 104 of each discharge electrode 100a–100c are connected to their respective high voltage generators HVGa–HVGc. Accordingly, a person in contact with one of these discharge electrodes 100a–100c will not receive a shock immediately, but rather will receive a shock when the person touches a ground.

While the invention has been described with respect to two preferred embodiments, it will be appreciated that many other variations, modifications and applications of the invention may be made.

What is claimed is:

1. A protective system for protecting a motor vehicle driver against an assault or threat of violence by a passenger, comprising:
a discharge electrode disposed on the vehicle seat to be occupied by such passenger, and exposed for contact by the passenger when sitting on the seat;
a high voltage generator connected to said electrode;
and electrical switch means actuated by the driver for energizing said discharge electrode.

2. The system according to claim 1, wherein said discharge electrode includes at least one metal electrode element covered by an insulating layer to provide a capacitive discharge upon energization of the discharge electrode while in contact with the passenger occupying a seat equipped with the discharge electrode.

3. The system according to claim 1, wherein said discharge electrode includes two metal electrode elements each having a plurality of fingers, the fingers of one metal electrode element being interleaved between and spaced from the fingers of the other metal electrode element.

4. The system according to claim 3, further including a mode selector switch effective to select either an assault-protection mode wherein one of said metal electrode elements is connected to the high voltage generator and the other is connected to ground, or an intrusion-detection mode wherein both of said metal electrode elements are connected to the high voltage generator.

5. The system according to preceding claim 4, further including a sensor switch which is actuated by an intruder; an alarm device; and a control circuit including means effective, when the mode-selector switch is in the intrusion-detection mode, to actuate the alarm device upon the actuation of said sensor switch by an intruder.

6. The system according to claim 5, wherein said control circuit also actuates said high voltage generator upon the actuation of said sensor switch by an intruder.

7. The system according to claims 5, wherein there is at least one sensor switch which, upon actuation, immediately actuates said alarm device, and at least one other sensor switch which, upon actuation, actuates said alarm device only after a predetermined time delay to enable an authorized person to first disable the alarm device.

8. The system according to claim 1 wherein said high voltage generator includes an electronic pulse generator and an electronic switch.

9. The system according to claim 1, including a second discharge electrode disposed on a second seat to be occupied by a passenger; said electrical switch means including at least one switch actuated by the driver to select one of the discharge electrodes, and another switch actuated by the driver to energize the selected discharge electrode.

10. A protective system for protecting a given site against an intrusion, comprising: a high voltage generator; a discharge electrode for disposition at the site to be protected against intrusion; said discharge electrode comprising two metal electrode elements each having a plurality of fingers, the fingers of one metal electrode element being interleaved between and spaced from the fingers of the other metal electrode element; a control circuit including means effective to connect both of said metal electrode elements to the high voltage generator; and electrical switch means for energizing or deenergizing said high voltage generator.

11. The system according to claim 10, wherein said means in the control circuit effective to connect both of said metal electrode elements to the high voltage generator includes a mode selector switch effective to select an assault-protection mode wherein one of said metal electrode elements is connected to the high voltage generator and the other of said metal electrode elements is connected to ground, or an intrusion-detection mode wherein both of said metal electrode elements are connected to the high voltage generator.

12. The system according to claim 11, further including a sensor switch which is actuated by an intruder, and an alarm device, said control circuit including means effective, when the mode selector switch is in the intrusion-detection mode, to actuate the alarm device upon the actuation of said sensor switch by an intruder.

13. The system according to claim 12, wherein there is at least one sensor switch which, upon actuation, immediately actuates said alarm device, and at least one other sensor switch which, upon actuation, actuates said alarm device only after a predetermined time delay to enable an authorized person to first disable the alarm device.

14. The system according to claim 12, wherein said control circuit also actuates said high voltage generator upon the actuation of said sensor switch by an intruder.

15. The system according to claim 10, wherein said metal electrode elements of the discharge electrode are covered by a thin insulating layer to provide a capacitive discharge upon energization of the discharge electrode while in contact with an intruder when the intruder also touches ground.

* * * * *